Patented May 26, 1925.

1,539,193

UNITED STATES PATENT OFFICE.

HENRY G. JAEGER, OF ROSE HILL, CALIFORNIA, ASSIGNOR OF ONE-FOURTH TO DR. EVERETT R. LAMBERTSON, AND ONE-FOURTH TO GEORGE P. CLEMENTS, BOTH OF EAGLE ROCK CITY, CALIFORNIA, AND ONE-FOURTH TO JULIUS SCHNEIDER, OF LOS ANGELES, CALIFORNIA.

WATERPROOF COATING AND PROCESS.

No Drawing.    Application filed October 4, 1922. Serial No. 592,420.

*To all whom it may concern:*

Be it known that I, HENRY GEORGE JAEGER, a citizen of the United States, residing at Rose Hill, in the county of Los Angeles and State of California, have invented new and useful Improvements in a Waterproof Coating and Process, of which the following is a specification.

My present invention relates to a waterproof coating process, one object thereof being the development of such a process as shall yield permanent results at a low cost, the coating being relatively permanent and capable of ornamental effect, and a special object of my process is the preparation of a coating immune from checking, cracking or any appreciable tendency to separate from the surface coated, and which shall effectively interlock with the substance or material coated without appreciable absorption therein, my coating being especially suitable to materials such as cement concrete, composite or clay materials, or other structures, provided they do not contain free lime.

A further object of my invention is the preparation of a coating with which coloring matters such as are unaffected by contact with lime can be freely incorporated without an unfavorable effect upon the finish or the durability thereof.

Other objects of my invention will appear from the following description and the appended claims, in the consideration of which it should be understood that various modifications thereof are possible without departure from the spirit of the present invention, and that parts of my process may be independently employed in conjunction with various steps not herein set forth.

In the preferred form of my invention, I employ successively (1) a sizing compound, which may also be referred to as an excluding agent; (2) a paint-like liquid adapted to be spread; and (3) a finishing coat similar in its main ingredients to the mentioned sizing compound.

In the preparation of my sizing compound, I prefer to employ four parts of petroleum distillate, one part of japan drier, and one part of boiled linseed oil, these ingredients being thoroughly admixed and applied in sufficient quantity to overcome the suction of the surface to be coated without actually filling the pores thereof. In this connection, it should be emphasized that the pores of the material to which my sizing composition is applied are to be left in such condition that the coating to be applied thereto, that is to say, the paint-like liquid mentioned above, shall enter and lock within the respective pores in such a manner as to bind the same to the surface which is to be protected thereby. It should be understood that the sizing or excluding coat above referred to is intended to be entirely neutral in its relation both to the surface coating and to the paint-like liquid that is to be applied thereon, the success of the operations herein described being largely dependent upon the mechanical utilization of the mentioned pores in the material treated to provide a locking or engaging means for inwardly projecting irregularities in the paint-like coating which has been mentioned above and which may have a composition substantially as follows:

One part finely pulverized silica passing 200 meshes to the inch;

One part finely pulverized calcined magnesite;

Any desired lime-proof color in quantities sufficient to impart the desired tint;

Sufficient of 22° Bé. solution of chloride of magnesia to give a mixture of the above material a consistency suitable for spraying.

After the application of the above paint-like liquid, whether by spraying or in any other suitable manner, the surface thereof may be stippled or otherwise treated to produce ornamental inequalities in the surface thereof, and must then be permitted to undergo a drying during which it is believed that a new crystallization of the reacting ingredients takes place.

If desired, a finishing coat may then be applied, and for this finishing coat I prefer to use a mixture similar to the sizing preparation first mentioned above, except that I add to this any suitable hard drying varnish, such as a copal varnish, in the proportions necessary to produce the desired gloss. It should be understood that the "parts" referred to above are parts by weight, and when the proportions suggested above are employed, one-fourth of a part of the mentioned varnish, or less, will ordinarily be found sufficient to impart a satisfactory gloss.

If a dash finish is desired, this may be obtained by applying the desired material, as dry sand, to the paint-like surface, before crystallization has taken place therein, and the sand may, of course, be applied by means of an air-brush or in any usual manner.

While I have herein set forth in detail one preferred embodiment of my invention, it should be understood that various features thereof may be used independently, and that various modifications will be found possible by those skilled in the art with out departing from the spirit of my invention as indicated in the above example and set forth in the appended claims.

I claim as my invention:

1. The method which comprises applying an oil sizing or excluding agent to a surface to be coated in sufficient quantity to overcome suction without actually filling the pores thereof, and afterward applying thereto an oxychloride cement thinned to the desired consistency and capable of undergoing crystallization throughout its mass and partially within said pores.

2. The method which comprises applying an oil sizing or excluding agent to a surface to be coated in sufficient quantity to overcome suction without actually filling the pores thereof, afterward applying thereto an oxychloride cement thinned to the desired consistency and capable of undergoing crystallization throughout its mass and partially within said pores, and then applying a finishing coating similar to the sizing agent but comprising a hard-drying varnish.

3. The method which comprises applying an oil sizing or excluding agent containing petroleum distillate, a drier, and linseed oil, in sufficient quantity to overcome the suction of the surface coated without actually filling the pores thereof, and then applying thereto a composition comprising calcined magnesite, finely divided silica and magnesium chloride.

4. The method which comprises applying an oil sizing or excluding agent containing petroleum distillate, a drier and linseed oil in sufficient quantity to overcome the suction of the surface coated without actually filling the pores thereof, then applying thereto a composition comprising calcined magnesite, finely divided silica and magnesium chloride, stripping the surface so prepared, and then applying a finish coating similar to the sizing agent but comprising a hard drying varnish.

In testimony whereof I have signed my name to this specification.

H. G. JAEGER.